United States Patent [19]
Yui et al.

[11] Patent Number: 4,552,689
[45] Date of Patent: Nov. 12, 1985

[54] ELECTRICALLY CONDUCTIVE INORGANIC FILLER CONTAINING PROPYLENE POLYMER COMPOSITIONS

[75] Inventors: Hiroshi Yui; Yoshihiro Sobajima; Osamu Higashide; Tsuyoshi Imamura; Michiya Okamura; Satoru Hattori, all of Mie, Japan

[73] Assignee: Mitsubishi Petrochemical Co., Ltd., Tokyo, Japan

[21] Appl. No.: 664,172

[22] Filed: Oct. 24, 1984

Related U.S. Application Data

[62] Division of Ser. No. 418,963, Sep. 16, 1982, Pat. No. 4,504,617.

[30] Foreign Application Priority Data

Sep. 16, 1981 [JP] Japan ............................. 56-145974
Dec. 22, 1981 [JP] Japan ............................. 56-207626

[51] Int. Cl.$^4$ ........................ C08K 3/26; C08K 3/04; H01B 1/06
[52] U.S. Cl. ................................. 252/511; 524/426; 524/427; 524/496; 524/525
[58] Field of Search ............... 252/511; 524/496, 426, 524/427, 449, 451, 525, 526

[56] References Cited

U.S. PATENT DOCUMENTS 3,951,871  4/1976  Lloyd et al. ..................... 252/511
3,963,647  6/1976  Straub ............................. 252/511
4,002,595  1/1977  Adelman .......................... 252/511
4,229,504  10/1980 Brachman ......................... 524/451
4,321,162  3/1982  Guffens et al. ................... 524/495
4,341,827  7/1982  Austen et al. .................... 524/451

Primary Examiner—Herbert J. Lilling
Attorney, Agent, or Firm—Sughrue, Mion, Zinn, Macpeak, and Seas

[57] ABSTRACT

An inorganic filler containing propylene polymer composition which comprises 25 to 90% by weight of component (A) and 75 to 10% by weight of component (B):

(A) at least one member selected from the group consisting of
 (a) a crystalline propylene copolymer composed of propylene and one or more other α-olefins;
 (b) a composition prepared by blending the copolymer (a) with a synthetic rubber and/or crystalline polypropylene; and
 (c) a composition prepared by blending a crystalline polypropylene with a synthetic rubber, wherein
 (1) the amount of xylene extractable soluble component at 23° C. is 10 to 50% by weight, and
 (2) the propylene content in the extractable soluble component is 30% by weight or more, (B) an inorganic filler having an average particle size of 200μ or less, measured by light transmission in a liquid-phase sedimentation system.

4 Claims, 3 Drawing Figures

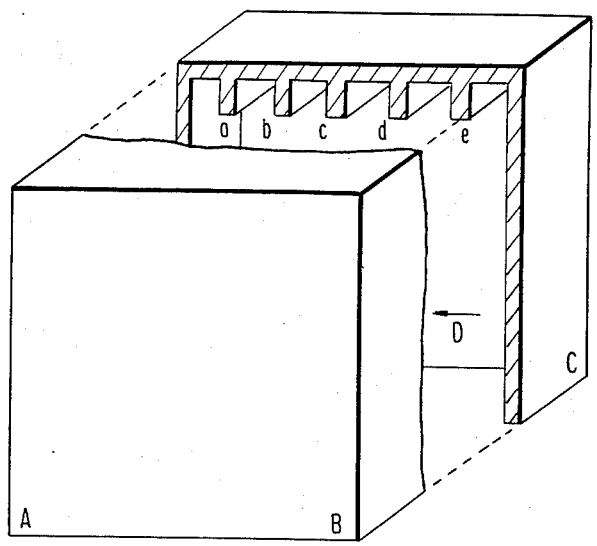
FIG. 1
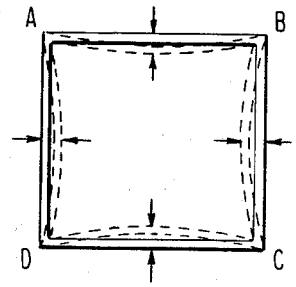
FIG. 2
FIG. 3a
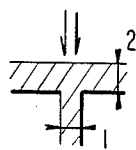
FIG. 3b
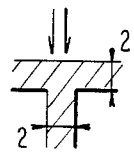
FIG. 3c
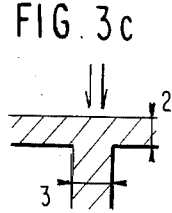
FIG. 3d
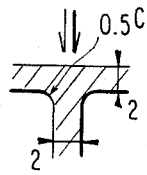
FIG. 3e
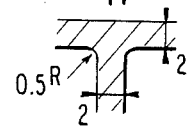

ELECTRICALLY CONDUCTIVE INORGANIC FILLER CONTAINING PROPYLENE POLYMER COMPOSITIONS

This is a division of application Ser. No. 418,963 filed 9/16/82 now U.S. Pat. No. 4,504,617.

FIELD OF THE INVENTION

The present invention relates to propylene polymer compositions having a very low coefficient of molding contraction, excellent mechanical properties and excellent external appearance which are attained by blending specified components.

BACKGROUND OF THE INVENTION

Polypropylene has been used in great quantities as a resin having excellent rigidity, heat resistance, electric properties and chemical stability and high molding property.

However, polypropylene has the severe fault that injection moldings thereof have very poor dimensional accuracy to cause sink or warp, as it is a crystalline resin. Consequently, polypropylene has hardly been used in uses requiring high dimensional accuracy, such as precision parts, business instruments, domestic electric appliances, etc.

To improve the dimensional accuracy of polypropylene, the addition of inorganic fillers is effective, and plate or fibrous fillers are particularly effective.

However, when a fibrous filler, for example, glass fibers, is added, injection moldings have anisotropy in the coefficient of molding contraction in the molding direction (lengthwise direction) and in the rectangular direction (cross direction). Consequently, such moldings cannot be used for precision parts or goods requiring a good external appearance because high warpage is caused.

Further, among the plate fillers it is known that talc is excellent from the viewpoint of the rigidity and impact resistance of the polypropylene compositions.

However, prior art polypropylene compositions to which talc has been added have poor dimensional accuracy and cause sink or warp because of their high coefficient of molding contraction. Therefore, they cannot be put to practical use as molding materials.

It has also been proposed to add talc and natural rubber in order to reduce the coefficient of molding contraction (for example, see Japanese Patent Application (OPI) No. 136735/76 (the term "OPI" as used herein refers to a "published unexamined Japanese patent application")). However, even following this procedure molding contraction is so great it causes sink or warp, and such compositions cannot be practically used for precision parts or goods requiring a good external appearance.

SUMMARY OF THE INVENTION

An object of the present invention is to provide propylene polymer compositions having excellent rigidity, heat resistance, impact resistance, molding properties and external appearance, etc., in which dimensional accuracy and deformation or warping of moldings are remarkably improved.

The present invention thus relates to inorganic filler containing propylene polymer compositions which comprises 25 to 90% by weight of the following component (A) and 75 to 10% by weight of the following component (B).

(A) At least one selected from the group consisting of (a) a crystalline copolymer of propylene and one or more other α-olefins, (b) a composition prepared by blending copolymer (a) with synthetic rubber and/or crystalline polypropylene, and (c) a composition prepared by blending crystalline polypropylene with synthetic rubber, wherein (1) the amount of xylene extractable soluble components at 23° C. is 10 to 50% by weight and (2) the propylene content in the extractable soluble component is 30% by weight or more.

(B) An inorganic filler having an average particle size, measured by the light transmission method in a liquid-phese sedimentation system, of 200μ or less.

The compositions of the present invention are suitable as materials for the manufacture of goods which require dimensional accuracy and a good external appearance.

BRIEF DESCRIPTION OF THE DRAWINGS

FIG. 1 is a partial sectional view of an injection molding obtained in a Reference Example.

FIG. 2 is a bottom view which indicates the sites for measuring the warpage of the molding of FIG. 1 as shown by the arrows.

FIG. 3 are sectional views which indicate the points for measuring the size and shape of parts a to e in FIG. 1 and the sink mark of each part, where the arrows indicate the direction of sinkage.

DETAILED DESCRIPTION OF THE INVENTION

The light transmission method used herein is according to the method described in, for example, *Ryudo Bunpu Sokuteiho (Measurement Method of Particle Distribution)*, issued by Shimazu Seisakusho and *Funtai Bussei Zusetsu (Physical Characteristics of Powders)*, pp. 92–95, May, 1975, Sangyo Gijutsu Center.

The crystalline propylene copolymer (a) used in the present invention is a crystalline copolymer resin containing at least 50 wt% of propylene prepared by polymerizing propylene and one or more other α-olefins using a conventional Ziegler-Natta catalyst. The α-olefins include those having 2 to 12 carbon atoms, including ethylene. The crystalline propylene copolymer has a melt flow rate of 0.05–100 g/min and isotactic index of 50 to 99.9.

The crystalline propylene copolymer resin contains propylene units as a major component (at least 50 wt%). Examples of which include crystalline propylene-ethylene block or random copolymers, crystalline propylene-butene block or random copolymers, crystalline propylene-hexene block or random copolymers, crystalline propylene-heptene block or random copolymers and crystalline propylene-ethylene-butene copolymers. Particularly, crystalline propylene-ethylene block copolymers having an ethylene content of 30% by weight or less are preferred. Such a crystalline propylene copolymer resin can be suitably selected from those available in the market.

Examples of the synthetic rubber used in the present invention include ethylene-propylene copolymer rubbers (EPM and EPDM), styrene-butadiene copolymer rubbers (SBR and SBS block copolymer) and hydrogenated products thereof, isoprene rubbers, isoprene-isobutylene rubbers, etc. Particularly, ethylene-propylene copolymer rubbers are preferred.

The above crystalline polypropylene used in the present invention preferably has a melt flow rate (MFR) of 0.1 to 150 g/10 minutes, more preferably 1 to 20 g/10 minutes from the viewpoint of fluidity in molding. Further, it is preferred that the isotactic index (II), which represents % by weight of n-heptane insoluble component, be 90 or more, more preferably 95 or more, most preferably 95 to 99.9, from the viewpoint of the heat resistance and rigidity of the compositions of the present invention.

Such crystalline polypropylene homopolymer can be suitably selected from those available in the market.

These components are selected from the group consisting of (a) the crystalline propylene copolymer itself, (b) a composition prepared by blending the copolymer (a) with synthetic rubber and/or crystalline polypropylene having isotactic index of 80 to 99.9, and (c) a composition prepared by blending the crystalline polypropylene with synthetic rubber, but they should have the following properties (1) and (2).

(1) The amount of xylene extractable soluble component is 10 to 50% by weight, preferably 15 to 50% by weight and particularly 20 to 45% by weight.

(2) The propylene content in said extractable soluble component is 30% by weight or more, preferably 30 to 80% by weight and particularly 35 to 80% by weight.

Compositions which do not have properties (1) and (2) are not preferred from the viewpoint of coefficient of molding contraction, mechanical strength and external appearance, etc.

Particularly, in the case that the amount of xylene extractable soluble component per above described (1) is 15 to 50% by weight and the propylene content in the above described (2) is 35 to 80% by weight, the coefficient of molding contraction becomes 0.6% or less when an inorganic filler described later as component (B) is added to form compositions of the present invention.

Component (A) used in the present invention has the above described form and properties. Among them, preferred examples include a composition (b') prepared by blending crystalline propylene copolymer (a) with synthetic rubber and crystalline propylene copolymer (a) in which the propylene content in the xylene extractable soluble component per above described (2) is 30 to 80% by weight, preferably 35 to 80% by weight.

Particularly, a composition (b') prepared by blending crystalline propylene copolymer (a) in which the propylene content in the xylene soluble component in the above described (2) is 30 to 80% by weight, preferably 35 to 80% by weight, with synthetic rubber is preferred.

A further preferred composition is the composition (b') in which the ratio ($\eta_1/\eta_2$) of the viscosity ($\eta_1$) of the composition (b') at a shear rate ($\dot{\gamma}$) of $1 \times 10^3$ sec$^{-1}$ to the viscosity ($\eta_2$) of the synthetic rubber at the same shear rate is 0.1 to 10, preferably 0.15 to 7. The viscosity is measured by means of an Instron capillary rheometer melt viscosity measurement device using a standard capillary (diameter/length=33.13) at a temperature of 230° C. and an extrusion rate gear ratio of 1:1.

Measurement of the xylene soluble component at 23° C. is carried out by the method which comprises putting 3 g of sample in 1,000 ml of boiled xylene, cooling in the air to 23° C., separating soluble components and measuring the weight thereof.

Measurement of the propylene content in the extractable soluble component is carried out by the method of measuring the propylene content of the soluble components by means of an infrared spectrophotometer.

The inorganic filler—component (B)—used in the present invention has an average particle size, measured by the light transmission method in a liqud-phase sedimentation system, of 200$\mu$ or less (preferable lower limit: 0.1$\mu$).

Examples of the inorganic filler include talc, mica, silica, calcium carbonate, wollastonite, bentonite, etc. Talc and mica are preferred. Further, calcium carbonate is particularly preferred for improving balance between rigidity and impact stength used together with talc or mica.

Preferred talc is that which has an average particle size of 0.5 to 20$\mu$, more preferably 0.5 to 5$\mu$, wherein the content of coarse particles having a size of 10$\mu$ or more is 10% by weight or less and the specific surface area is 15,000 cm$^2$/g or more, preferably not exceeding 100,000 cm$^2$/g.

It is particularly preferred to use talc which is prepared by finely powdering and classifying steatite (e.g., from China) having a total content of iron and aluminum as impurities of 0.9% by weight or less.

Preferred mica is that which has an average particle size of 100$\mu$ or less and a specific surface area of 3,000 cm$^2$/g or more, preferably not exceeding 100,000 cm$^2$/g.

Examples of useful micas include muscovite (white mica), red mica, soda mica, silk mica, vanadium mica, isolite, black mica, phlogopite (gold mica), etc. Muscovite and phlogopite are particularly preferred.

The particle size distribution of the inorganic filler is measured by a light transmission method in a liquid-phase sedimentation system. As measuring devices, there can be used a CP type made by Shimazu Seisakusho Ltd. The average particle size means the particle size at the 50% point on the integral curve of distribution of particle size measured by the light transmission method. Relative surface area is measured by a conventional method, the air permeation method by means of a constant pressure air permeation type relative surface area measuring device, for example, measuring device SS-100 for measuring relative surface area of powders made by Shimazu Seisakusho Ltd., etc.

The inorganic filler in the present invention may be used without any surface treatment, but it is possible to subject the same to surface treatment with various kinds of surface treating agents. Examples of surface treating agents include waxes, saturated higher aliphatic acids and metal salts thereof, unsaturated higher aliphatic acids and metal salts thereof, titanate or silane coupling agents, and surface active agents, etc. The amount of the surface treating agents used is 0.01 to 10 wt% based on the weight of the filler.

Components (A) and (B) are used in such an amount that component (A) is 25 to 90% by weight, preferably 30 to 80% by weight and particularly 50 to 80% by weight and the component (B) is 75 to 10% by weight, preferably 70 to 20% by weight and particularly 50 to 20% by weight, of the total weight of components (A) and (B).

Compositions departing from the above described ranges cannot be put to practical use because they have inferior properties.

It is possible to add additional components to the compositions of the present invention. As such additional components, there are antioxidants such as phenol, sulfur or phosphorus antioxidants, derivatives of higher aliphatic acids, such as metal salts, amides or esters, etc., organic and inorganic pigments, ultraviolet ray absorbing agents, antistatic agents, anti-cracking agents, neutralizing agents, antifoaming agents, fire retardants and thermoplastic resins other than the resins used in the present invention. The amount of the additional components used is 0.01 to 10 wt% based on the total weight of the composition.

Compositions to which electrically conductive carbon black is added in an amount of 2 to 100 parts by weight, preferably 4 to 50 parts by weight, based on 100 parts of a total of the above described components (A) and (B) are especially useful as they also function as electrically conductive compositions. Carbon black having a specific surface area of 900 to 1,200 m$^2$/g is preferred.

As such electrically conductive carbon black, it is possible to utilize conventional electrically conductive carbon black such as furnace black, channel black. Particularly, S.C.F. (Super Conductive Furnace), E.C.F. (Electric Conductive Furnace) and Ketjen Black (trade name, produced by AKZO Co.) having a high specific surface area are advantageously used, because high electrical conductivity is obtained by adding the same in a small amount. Ketjen Black having a specific surface area of 850 m$^2$/g or more, particularly 900 m$^2$/g or more (with a preferred upper limit of 3,000 m$^2$/g) is particularly preferable because high electrical conductivity is obtained by adding the same in a very small amount.

The compositions of the present invention are produced using conventional blending devices such as a uniaxial extruder, a biaxial extruder, a Bunbury mixer, rolls, a brabender plastograph, etc. Usually, the compositions are kneaded by an extruder to form pellets, which are then processed by, for example, injection molding at pressure of 500 to 1,000 kg/cm$^2$. In some cases, propylene copolymer and talc are kneaded by feeding them directly to the molding apparatus to produce moldings.

The compositions of the present invention are remarkably excellent in dimensional accuracy and have an epochal property as crystalline propylene polymer compositions that can be used to form moldings which hardly cause sink and warp, whereby dimensional accuracy and properties relating to sink and warp as good as those of noncrystalline resins such as acrylonitrile-butadiene-styrene resins or polystyrene, etc., are realized. Accordingly, they have characteristics that make them remarkably suitable for forming precision parts, business instruments and domestic electric appliances for which prior art crystalline propylene polymer compositions can not be used, for example, parts of clocks, copying machine housings, sewing machine housings, videotape cassettes, audiotape cassettes, television front pannels, recording type cassette, radio housings, etc., i.e., their practical value is remarkably high.

In the following, the present invention is illustrated in greater detail with reference to examples.

In the examples, the coefficient of molding contraction is the average value obtained by measuring the length and the width of a sheet at 23° C. and determining the respective ratio thereof to the size (corresponding length and width) of the mold after the sheet 127 mm (length); 12.7 mm (width); 2 mm (thickness) is formed by injection molding and conditioned at 23° C. for 24 hours.

The sink mark and the warp of moldings, excluding those in Reference Example 1, were visually observed.

Further, bending elastic modulus was measured according to the procedure of JIS K-7203, heat deformation temperature was measured according to the procedure of JIS K-7207 (weighting 4.6 kg/cm$^2$), Du Pont impact strength was measured according to the procedure of JIS K-5400 and impact strength was measured according to the procedure of JIS-7110.

Gloss was measured by determining the ratio of the mirror reflection luminous flux which resulted upon applying a luminous flux at an incident angle of 60° parallel to the molding direction of a sheet 100 mm (length)×100 mm (width)×2 mm (thickness) produced by injection molding and receiving it at a receiving angle of 60° as compared to the mirror reflection luminous flux from a glass surface having a refractive index of 1.567 which results under the same condition as described above. Measurement was carried out according to the procedure of JIS Z-8741-1962.

Measurement of the weld external appearance was carried out as follows. An injection molded sheet 5 cm×8 cm×3 mm was formed with using a mold which was designed such that fused resin is introduced from two positions in the lengthwise direction of the sheet, whereby a weld line is caused.

The formed weld mark was classified into the following 5 stages and the weld external appearance graded thereby.

5: The weld line is clear and fingers feel a projection.
4: The weld line is clear, but fingers do not feel a projection. However, a broad area having a different gloss is present along the weld line.
3: The weld line is observed, but abnormality of gloss around the weld line is small.
2: Abnormalities of the weld line and gloss are slightly observable.
1: The weld line is hardly observable.

Grades 3 to 1 are generally allowable in the market but there is a substantial difference between the Grade 4 and the Grade 3.

Volume resistivity was measured by the Wheatstone bridge method performed according to the procedure of SRIS standard 2301-1969.

The viscosities ($\eta_2$, $\eta_1$) of the ethylene-propylene copolymer rubber and resin composition are the values at a shear rate ($\dot{\gamma}$) of $1 \times 10^3$ sec$^{-1}$ measured by means of an Instron capillary rheometer melt viscosity measurement device using a standard capillary (diameter/length=33.13) at a temperature of 230° C. and an extrusion rate gear ratio of 1:1.

EXAMPLE 1

Using a Ziegler-Natta catalyst, propylene and ethylene were copolymerized to obtain a crystalline propylene-ethylene block copolymer ($\alpha$1) having an ethylene content of 15% by weight which contained a xylene extractable soluble component at 23° C. of 21% by weight and which had a melt flow rate of 10 g/10 minutes. The propylene content in the 23° C. xylene extractable soluble component in this copolymer ($\alpha$1) was 50% by weight.

60 parts by weight of a powder of copolymer ($\alpha$1) and 40 parts by weight of finely divided talc (containing a total of 0.1% by weight of iron and aluminum as impurities) having an average particle size of 2.8$\mu$ and a specific surface area of 27,000 cm$^2$/g in which the content of coarse particles having a size of 10$\mu$ or more was 5% by weight, which was produced from steatite from China, were uniformly blended using a supermixer together with 0.1 part by weight of 2,6-di-t-butyl-4-methylphenol and 0.1 part by weight of tetrakis[methylene(3,5-di-t-butyl-4-hydroxyhydrocinnamate)]methane, and the mixture was then kneaded using a biaxial extruder having a diameter of 30 mm to produce pelelts. These pellets were molded at 240° C. using a screw in-line injection molding machine to form test samples, and the test samples were evaluated.

For comparison, the above described propylene-ethylene block copolyer (α1), crystalline polypropylene (α2) having a melt flow rate of 10 g/10 minutes, a composition prepared by blending 60 parts by weight of the homopolymer (α2) with 40 parts by weight of the same talc as described above, and a composition prepared by blending 60 parts by weight of a composition (α3) (the viscosity ($\eta_1$) of this composition was $3.6 \times 10^2$ poises and the ratio ($\eta_1/\eta_2$) of this viscosity ($\eta_1$) to the viscosity ($\eta_2$) of ethylene-propylene copolymer (EP 07P) was 0.08) having a melt flow rate of 10 g/10 minutes and containing a 23° C. xylene extractable soluble component (propylene content 28% by weight) of 21% by weight which was prepared by blending 79 parts by weight of the above described homopolymer (α2) with 21 parts by weight of ethylene-propylene copolymer rubber (EP 07P, produced by Mitsubishi Petro-Chemical Co., propylene content: 26 wt%, Mooney viscosity $ML_{1+4}$ (100° C.): 70, viscosity ($\eta_2$): $4.5 \times 10^3$ poises) with 40 parts by weight of the same talc as described above were molded, respectively, in the same manner as described above and they were evaluated.

Results are shown in Table 1.

TABLE 1

| | Composition (parts by weight) | | | Evaluation | | |
|---|---|---|---|---|---|---|
| | Polymer | | Talc A-mount | Coefficient of Molding Contraction (%) | Sink Mark | Warp |
| No. | Kind | Amount | | | | |
| 1 | α1 | 60 | 40 | 0.47 | Hardly observed | Hardly observed |
| 2* | α1 | 100 | — | 1.70 | Great | Great |
| 3* | α2 | 100 | — | 1.60 | " | " |
| 4* | α2 | 60 | 40 | 1.00 | Fairly great | Small |
| 5* | α3 | 60 | 40 | 0.80 | " | " |

*Comparative example

REFERENCE EXAMPLE 1

Pellets of composition No. 1 in Example 1 and pellets of the compositions of Comparative Examples No. 3 and No. 4 in Example 1 were molded by a screw in-line injection molding apparatus to form box type moldings having the shape shown in FIG. 1 and the size of the resulted moldings was then measured.

As can be understood from the results shown in Table 2, the composition of the Example of the present invention showed very good dimensional accuracy as compared with those of the Comparative Examples.

Further, in the box shown in FIG. 1, the length, the width and the height were all 80 mm and the thickness was 2 mm excluding hanging ribs a to e. The injection gate part is the central part on the uppermost face. The thickness of each of hanging ribs a to e is as shown in FIG. 3 and the height thereof was all 10 mm.

TABLE 2

| | Warp (mm) | | | | Sink ($\times \frac{1}{100}$ mm) | | | | | A-B Length (mm) |
|---|---|---|---|---|---|---|---|---|---|---|
| | A-B | B-C | C-D | D-A | a | b | c | d | e | |
| Example (No. 1) | 0.1 | 0.14 | 0.2 | 0.16 | 0.6 | 1.1 | 2.0 | 1.5 | 1.5 | 79.6 |
| Comparative Example (No. 3) | 1.4 | 1.7 | 2.0 | 1.8 | 2.6 | 3.4 | 7.5 | 4.5 | 4.9 | 78.7 |
| Comparative Example (No. 4) | 0.4 | 0.5 | 0.7 | 0.6 | 1.5 | 2.4 | 5.6 | 3.4 | 3.5 | 79.2 |

(Note) Warp is the values at the portions shown by the arrow in FIG. 2 and sink is the values at the portions shown by the arrow in FIG. 3.

EXAMPLE 2

100 parts by weight of a crystalline propylene-ethylene block copolymer (23° C. xylene extractable soluble component: 29% by weight; propylene content in the extractable soluble component: 46% by weight) prepared by copolymerizing propylene and ethylene using a Ziegler-Natta catalyst and 1 part by weight of ethylene-propylene copolymer rubber (EP 70P) as was used in Example 1 were blended and kneaded to obtain a propylene-ethylene copolymer composition having an ethylene content of 18% by weight and containing 30% by weight of the 23° C. xylene extractable soluble component. The propylene content in the 23° C. xylene extractable soluble component of this composition was 45% by weight. The viscosity ($\eta_1$) of this composition was $8.0 \times 10^2$ poises and the ratio ($\eta_1/\eta_2$) was 0.17.

After this copolymer composition and finely divided talc having an average particle size of 1.5μ and a specific surface area of 27,000 cm²/g in which the content of coarse particles having a size of 5μ or more was 5%, which was produced from steatite from China, were blended and kneaded in various ratios, the resultant mixture was molded as per Example 1 to form test samples which were evaluated in the same manner as in Example 1.

As can be understood from the results shown in Table 3, the dimensional accuracy and the external appearance of moldings were remarkably excellent per the present invention, and rigidity, heat resistance and impact resistance thereof were also excellent.

TABLE 3

| No. | Talc Content (% by weight) | Coefficient of Molding Contraction (%) | Sink and Warp | Modulus of Bending Elasticity (kg/cm²) | Heat Deformation Temperature (°C.) | Du Pont Impact Strength (kg · cm) |
|---|---|---|---|---|---|---|
| 6 | 20 | 0.58 | Hardly observed | 18,000 | 114 | 90 |
| 7 | 30 | 0.51 | Hardly observed | 23,000 | 117 | 75 |
| 8 | 40 | 0.40 | Hardly observed | 28,000 | 120 | 58 |
| 9 | 50 | 0.35 | Hardly observed | 32,000 | 125 | 20 |

TABLE 3-continued

| No. | Talc Content (% by weight) | Coefficient of Molding Contraction (%) | Sink and Warp | Modulus of Bending Elasticity (kg/cm$^2$) | Heat Deformation Temperature (°C.) | Du Pont Impact Strength (kg · cm) |
|---|---|---|---|---|---|---|
| 10* | 0 | 1.6 | Great | 9,000 | 106 | ≧100 |

*Comparative Example

EXAMPLE 3

(Sample No. 11)

75 parts by weight of crystalline-ethylene block copolymer having an ethylene content of 12% by weight, containing 9.6% by weight of 23° C. xylene extractable soluble component in which the propylene content was 63% by weight, and having a melt flow rate of 15 g/10 minutes and 25 parts by weight of propylene-ethylene copolymer rubber (EP 07P) as was used in Example 1 were blended and kneaded to prepare a propylene copolymer composition containing 32% by weight of 23° C. xylene extractable soluble component in which the propylene content was 45% by weight. The viscosity ($\eta_1$) of this composition was $9.5 \times 10^2$ poises and the ratio ($\eta_1/\eta_2$) was 0.21.

A test sample was produced in the same manner as in Example 1 using 60 parts by weight of the above described composition, 40 parts by weight of talc from China having a particle size of 1.2μ and a specific surface area of 50,000 cm$^2$/g in which the content of coarse particles having a size of 10μ or more was 1% by weight, 0.1 part by weight of 2,6-di-t-butyl-4-methylphenol and 0.1 part by weight of tetrakis[methylene(3,5-di-t-butyl-4-hydroxyhydrocinnamate)]methane. When the coefficient of contraction thereof was measured, it was 0.40%. Sink or warping was hardly observed.

EXAMPLE 4

Propylene and ethylene were copolymerized using a Ziegler-Natta catalyst to prepare crystalline propylene-ethylene block copolymer (α4) having an ethylene content of 12% by weight, containing 20% by weight of 23° C. xylene extractable soluble component and having a melt flow rate of 10 g/10 minutes. The propylene content of the 23° C. xylene extractable soluble component in copolymer (α4) was 34% by weight.

A test sample was produced by molding in the same manner as in Example 1 using 50 parts by weight of a powder of copolymer (α4), 50 parts by weight of the same talc as used in Example 1, 0.1 part by weight of 2,6-di-t-butyl-4-methylphenol and 0.1 part by weight of tetrakis[methylene(3,5-di-t-butyl-4-hydrocinnamate)]methane, and the same then evaluated.

For comparison, the above described propylene-ethylene copolymer (α4), a composition prepared by kneading 50 parts by weight of crystalline polypropylene (α2) as was used in Example 1 as a comparative example with 50 parts by weight of the same talc as described above, and a composition prepared by blending 50 parts by weight of a composition (α5) having a melt flow rate of 10 g/10 minutes and containing 20% by weight of 23° C. xylene extractable soluble component (propylene content: 26% by weight) which was prepared by blending 80 parts by weight of the above described polypropylene (α2) with 20 parts by weight of ethylene-propylene copolymer rubber as was used in Example 1 with 50 parts by weight of the same talc as described above were molded, respectively, in the same manner as described in Example 1, and thereafter they were evaluated.

Results are shown in Table 4.

The sample per the present invention had a good coefficient of molding contraction and was excellent in sink and warp.

TABLE 4

| | Composition (parts by weight) | | | Evaluation | |
|---|---|---|---|---|---|
| | Polymer | | Talc A- | Coefficient of Molding Contraction | | |
| No. | Kind | Amount | mount | (%) | Sink | Warp |
| 12 | α4 | 50 | 50 | 0.52 | Hardly observed | Hardly observed |
| 13* | α4 | 100 | — | 1.70 | Great | Great |
| 14* | α2 | 50 | 50 | 0.90 | Fairly great | Small |
| 15* | α5 | 50 | 50 | 0.80 | Fairly great | " |

*Comparative Example

EXAMPLE 5

64 parts by weight of crystalline polypropylene (α2) as was used in Example 1 as a comparative example and 36 parts by weight of ethylene-propylene copolymer rubber (sample produced by Mitsubishi Petro-Chemical Co., the viscosity ($\eta_2$): $2.7 \times 10^3$ poises) were kneaded to obtain composition (α6). The viscosity thereof ($\eta_1$) was $4.0 \times 10^2$ poises and the ratio ($\eta_1/\eta_2$) of this viscosity ($\eta_1$) to the viscosity ($\eta_2$) of the rubber was 0.098. The 23° C. xylene extractable soluble component of this composition (α6) was 37% by weight and the propylene content thereof was 51% by weight.

A test sample was produced by molding in the same manner as in Example 1 using 50 parts by weight of composition (α6), 50 parts by weight of talc as was used in Example 1, 0.1 part by weight of 2,6-di-t-butyl-4-methylphenol and 0.1 part by weight of tetrakis[methylene(3,5-di-t-butyl-4-hydrocinnamate)]methane, and the same was then evaluated.

For comparison, a composition prepared by kneading 50 parts by weight of the above described polypropylene (α2) and 50 parts by weight of the same talc as described above and a composition prepared by kneading 50 parts by weight of a composition (α7)—the viscosity ($\eta_1$) thereof was $4.4 \times 10^2$ poises and the ratio ($\eta_1/\eta_2$) of this viscosity ($\eta_1$) to the viscosity ($\eta_2$) of the rubber EP 07P was b 0.098—containing 37% by weight of 23° C. xylene extractable soluble component (propylene content: 27% by weight) which was prepared by blending 64 parts by weight of the above descrived polypropylene (α2) with 36 parts by weight of ethylene-propylene copolymer rubber (EP 07P) as was used in Example 1, and 50 parts by weight of the same talc as described above were molded, respectively, in the same manner as described in Example 1, and the moldings were evaluated.

Results are shown in Table 5.

The sample per the present invention had a good coefficient of molding contraction as compared with the comparative examples, and it was excellent in sink and warp.

TABLE 5

| | Composition (parts by weight) | | Evaluation | | |
|---|---|---|---|---|---|
| | Polymer | | Coefficient of Molding Contraction | | |
| No. | Kind | Amount | Talc A-mount | (%) | Sink | Warp |
| 16 | α6 | 50 | 50 | 0.52 | Hardly observed | Hardly observed |
| 17* | α2 | 50 | 50 | 0.90 | Great | Great |
| 18* | α7 | 50 | 50 | 0.78 | Fairly great | Small |

*Comparative Example

EXAMPLE 6

75 parts by weight of crystalline polypropylene (α2) and 25 parts by weight of ethylene-propylene copolymer rubber as was used in Example 1 having a propylene content of 60% by weight (sample produced by Mitsubishi Petro-Chemical Co.) were blended and kneaded to obtain a polypropylene composition containing 26% by weight of 23° C. xylene extractable soluble component. The propylene content of this 23° C. xylene extractable soluble component was 60% by weight.

After the above described composition and talc as was used in Example 2 were blended in various ratios, test samples were produced by molding as per Example 1 and evaluated in the same manner as described above.

Results are shown in Table 6.

Samples per the present invention were remarkably excellent in dimensional accuracy as compared with that of the Comparative Example, and had excellent mechanical properties.

TABLE 6

| No. | Talc Content (% by weight) | Coefficient of Molding Contraction (%) | Sink and Warp | Modulus of Bending Elasticity (kg/cm$^2$) | Heat Deformation Temperature (°C.) | Du Pont Impact Strength (kg · cm) |
|---|---|---|---|---|---|---|
| 19 | 25 | 0.62 | Hardly observed | 21,000 | 117 | 85 |
| 20 | 35 | 0.55 | Hardly observed | 27,000 | 120 | 70 |
| 21 | 45 | 0.47 | Hardly observed | 32,000 | 125 | 55 |
| 22 | 55 | 0.37 | Hardly observed | 38,000 | 131 | 18 |
| 23* | 0 | 1.80 | Great | 9,500 | 108 | >100 |

*Comparative Example

EXAMPLE 7

A test sample was produced by molding, in the same manner as in Example 1, using 70 parts by weight of crystalline propylene-ethylene block copolymer (α1) as was used in Example 1, 30 parts by weight of Canadian phlogopite having a specific surface area of 16,000 cm$^2$/g and an average particle size of 20μ, 0.1 part by weight of 2,6-di-t-butyl-4-methylphenol and 0.1 part by weight of tetrakis[methylene(3,5-di-t-butyl-4-hydroxyhydrocinnamate)]methane, and then evaluated.

For comparison, a composition prepared by kneading 70 parts by weight of crystalline polypropylene (α2) used in Example 1 as a comparative example and 30 parts by weight of the same phlogopite as described above and a composition prepared by kneading 70 parts by weight of a composition (α3) having a melt flow rate of 10 g/10 minutes and containing 21% by weight of 23° C. xylene extractable soluble component (propylene content: 28% by weight) which was prepared by blending 79 parts by weight of the above described polypropylene (α2) with 21 parts by weight of ethylene-propylene copolymer rubber (EP 07P) as was used in Example 1 (which was the same as composition (α3) used in Example 1 as a comparative example) and 30 parts by weight of the same phlogopite as described above were molded, respectively, in the same manner as in Example 1, and they were then evaluated.

Results are shown in Table 7.

TABLE 7

| | Composition (parts by weight) | | Evaluation | | |
|---|---|---|---|---|---|
| | Polymer | | Coefficient of Molding Contraction | | |
| No. | Kind | Amount | Talc A-mount | (%) | Sink | Warp |
| 24 | α1 | 70 | 30 | 0.55 | Hardly observed | Hardly observed |
| 25* | α2 | 70 | 30 | 1.05 | Fairly great | Small |
| 26* | α3 | 70 | 30 | 0.87 | Fairly great | " |

*Comparative Example

EXAMPLE 8

After a composition composed of crystalline propylene-ethylene block copolymer as was used in Example 2 and ethylene-propylene copolymer rubber (ethylene content: 18% by weight; 23° C. xylene extractable soluble component: 30% by weight; propylene content in the extractable soluble component: 45% by weight) and muscovite having an average particle size of 10μ and a specific surface area of 25,000 cm$^2$/g were blended in various ratios, the resultant mixtures were molded by the same manner as in Example 1 to produce test samples, which were then evaluated.

As can be understood from Table 8, samples per the Examples of the present invention are remarkably excellent in dimensional accuracy and external appearance of moldings prepared therefrom and had remarkably good rigidity, heat resistance and impact resistance.

TABLE 8

| No. | Talc Content (% by weight) | Coefficient of Molding Contraction (%) | Sink and Warp | Modulus of Bending Elasticity (kg/cm²) | Heat Deformation Temperature (°C.) | Du Pont Impact Strength (kg · cm) |
|---|---|---|---|---|---|---|
| 27 | 12 | 0.78 | Hardly observed | 16,000 | 126 | 70 |
| 28 | 25 | 0.53 | Hardly observed | 28,000 | 130 | 55 |
| 29 | 45 | 0.36 | Hardly observed | 57,000 | 140 | 18 |

EXAMPLE 9

Propylene and ethylene were copolymerized using Ziegler-Natta catalyst to prepare crystalline propylene-ethylene block copolymer (α8) having an ethylene content of 11% by weight, containing 16% by weight of 23° C. xylene extractable soluble component and having a melt flow rate of 10 g/10 minutes. The propylene content of the 23° C. xylene extractable soluble component in this copolymer (α8) was 40% by weight.

A test sample was produced by molding in the same manner as in Example 1 using 50 parts by weight of a powder of the copolymer (α8), 30 parts by weight of talc as used in Example 1, 20 parts by weight of cubic finely-divided precipitated calcium carbonate having an average particle size of 0.35μ and a content of coarse particles having a size of 5μ or more of 0.5 wt% which was subjected to surface treatment with stearic acid (obtained by blowing CO₂ gas into a Ca(OH)₂ suspension, in which stearic acid was dispersed in water, to form CaCO₃, the surface of which was coated with stearic acid, and hereinafter the same), 0.1 part by weight of 2,6-di-t-butyl-4-methylphenol and 0.1 part by weight of tetrakis[methylene(3,5-di-t-butyl-4-hydroxyhydrocinnamate)]methane, and the same was evaluated.

For comparison, the above described propylene-ethylene block copolymer (α8), crystalline polypropylene (α2) as was used in Example 1 was a Comparative Example, a composition prepared by kneading 50 parts by weight of the polypropylene (α2), 30 parts by weight of the same talc as was used in Example 1 and 20 parts by weight of the same calcium carbonate as described above, and a composition prepared by kneading 50 parts by weight of a composition (α9) having a melt flow rate of 10 g/10 minutes and containing 16% by weight of 23° C. xylene extractable soluble component (propylene content: 28% by weight) which was prepared by blending 84 parts by weight of the above described polypropylene (α2), 16 parts by weight of ethylene-propylene copolymer rubber (EP 07P) as used in Example 1, 30 parts by weight of the same talc as was used in Example 1 and 20 parts by weight of the same calcium carbonate as described above were molded, respectively, in the same manner as in Example 1, and they were then evaluated.

Results are shown in Table 9. The sample per the present invention was remarkably excellent in dimensional accuracy as compared with those of the Comparative Examples, and it had excellent mechanical properties.

TABLE 9

| | Composition (parts by weight) | | | Evaluation | | | |
|---|---|---|---|---|---|---|---|
| | Polymer | | Talc | Calcium Carbonate | Coefficient of Molding Contraction | Sink and | Modulus of Bending Elasticity | Izod Impact Strength |
| No. | Kind | Amount | Amount | Amount | (%) | Warp | (kg/cm²) | (kg · cm/cm) |
| 30 | α8 | 50 | 30 | 20 | 0.50 | Hardly observed | 28,000 | 9.5 |
| 31* | α8 | 100 | — | — | 1.70 | Great | 9,500 | 7.3 |
| 32* | α2 | 100 | — | — | 1.60 | " | 11,000 | 3.3 |
| 33* | α2 | 50 | 30 | 20 | 1.05 | " | 29,000 | 3.5 |
| 34* | α9 | 50 | 30 | 20 | 0.90 | Fairly great | 27,000 | 5.8 |

*Comparative Example

EXAMPLE 10

100 parts by weight of crystalline propylene-ethylene block copolymer (23° C. xylene extractable soluble component: 27% by weight, propylene content in the extractable soluble component: 41% by weight) obtained by copolymerizing propylene and ethylene using a Ziegler-Natta catalyst and 1 part by weight of ethylene-propylene copolymer rubber (EP 70P) as used in Example 1 were blended and kneaded to prepare a propylene-ethylene copolymer composition having an ethylene content of 20% by weight and containing 28% by weight of 23° C. xylene extractable soluble component. The viscosity ($\eta_1$) of this composition was b 7.5×10² poises and the ratio ($\eta_1/\eta_2$) was 0.16. The propylene content of the 23° C. xylene extractable soluble component in this composition was 40% by weight.

The above described copolymer composition, talc as was used in Example 2, and cubic finely-divided precipitated calcium carbonate having an average particle size of 0.20μ and a content of coarse particles having a particle size of 5μ or more of 0%, which had been subjected to surface treatment with stearic acid, were blended in various ratios, and test samples were prepared by molding them in the same manner as in Example 1 and they were then evaluated.

As can be understood from Table 10, samples per the Example of the present invention were remarkably excellent in dimensional accuracy as compared with those per the Comparative Examples, and had excellent mechanical properties.

TABLE 10

| No. | Filler Content (% by weight) Talc | Filler Content (% by weight) Calcium Carbonate | Coefficient of Molding Contraction (%) | Sink and Warp | Modulus of Bending Elasticity (kg/cm$^2$) | Izod Impact Strength (kg·cm/cm) |
| --- | --- | --- | --- | --- | --- | --- |
| 35 | 15 | 10 | 0.72 | Hardly observed | 16,000 | 8.0 |
| 36 | 25 | 15 | 0.55 | Hardly observed | 26,000 | 9.3 |
| 37 | 40 | 25 | 0.32 | Hardly observed | 42,000 | 8.5 |
| 38 | 45 | 30 | 0.28 | Hardly observed | 55,000 | 8.0 |
| 39 | 30 | 35 | 0.39 | Hardly observed | 38,000 | 10.5 |
| 40 | 10 | 45 | 0.70 | Hardly observed | 33,000 | 8.5 |
| 41* | 5 | 5 | 1.50 | Great | 10,000 | 7.2 |
| 42* | 0 | 0 | 1.65 | " | 9,300 | 7.0 |

*Comparative Example

EXAMPLE 11

Ethylene and propylene were copolymerized using a Ziegler-Natta catalyst to prepare a crystalline propylene-ethylene block copolymer having an ethylene content of 10% by weight, containing 12% by weight of 23° C. xylene extractable soluble component and having a melt flow rate of 20 g/10 minutes. The propylene content in the 23° C. xylene extractable soluble component in this copolymer was 32% by weight.

60 parts by weight of a powder of this copolymer were blended with talc and calcium carbonate used in Example 9 in various ratios so as to result in a total of 40 parts by weight. The resulted mixtures were molded together with antioxidants as was used in Example 9 to produce test samples in the same manner as in Example 1, and they were then evaluated.

As can be understood from the results shown in Table 11, samples per the present invention had remarkably excellent external appearance as compared with those of the Comparative Examples.

TABLE 11

| No. | Filler Content (parts by weight) Talc | Filler Content (parts by weight) Calcium Carbonate | Evaluation Luster (gloss) (%) | Evaluation Weld External Appearance (grade) | Evaluation Sink and Warp |
| --- | --- | --- | --- | --- | --- |
| 43 | 15 | 25 | 35 | 2 | Small |
| 44 | 20 | 20 | 32 | 2 | " |
| 45 | 30 | 10 | 28 | 3 | " |
| 46* | 40 | 0 | 15 | 4 | " |
| 47* | 0 | 40 | — | — | Great |

*Comparative Example

EXAMPLE 12

Propylene and ethylene were copolymerized with using a Ziegler-Natta catalyst to prepare a crystalline propylene-ethylene block copolymer (α10) having an ethylene content of 13% by weight, containing 21% by weight of 23° C. xylene extractable soluble component and having a melt flow rate of 15 g/10 minutes. The propylene content in 23° C. xylene extractable soluble component of this copolymer (α10) was 50% by weight.

60 parts by weight of a powder of this copolymer (α10), 40 parts by weight of Canadian phlogopite having an average particle size of 30μ and a specific surface area of 16,000 cm$^2$/g, 8 parts by weight of Ketjen Black (specific surface area: 1,000 m$^2$/g) and 0.2 part by weight of 2,6-di-t-butyl-4-methylphenol were blended, and a test sample was produced by molding in the same manner as in Example 1 and the same evaluated.

For comparison, test samples were produced by molding the above described propylene-ethylene block copolymer (α10), crystalline polypropylene (α11) having a melt flow rate of 15 g/10 minutes, and compositions composed of copolymer (α10) or polypropylene and mica, where 8 parts by weight of Ketjen Black as above were added to 100 parts by weight of each composition, and they were evaluated.

Results are shown in Table 12. As can be understood from this Table, the sample per the present invention was extremely excellent in dimensional accuracy as compared with the Comparative Examples, and had good electrical conductivity.

TABLE 12

| | Composition (parts by weight) | | | Evaluation | | | | |
| | | | | Electric Conductivity | Dimensional Accuracy | | General Properties | |
| No. | Polymer Kind | Polymer Amount | Mica Amount | Volume Resistivity (Ω·cm) | Coefficient of Molding Contraction (%) | Sink and Warp | Modulus of Bending Elasticity (kg/cm$^2$) | Heat Deformation Temperature (°C.) |
| --- | --- | --- | --- | --- | --- | --- | --- | --- |
| 48 | α10 | 60 | 40 | 55 | 0.42 | Hardly observed | 30,000 | 130 |
| 49* | α10 | 100 | — | 650 | 1.70 | Great | 9,000 | 102 |
| 50* | α11 | 100 | — | 110 | 1.60 | " | — | — |
| 51* | α11 | 60 | 40 | 85 | 1.00 | Fairly great | — | — |

*Comparative Example
For brevity, Ketjen Black is omitted from the Table.

EXAMPLE 13

100 parts by weight of crystalline propylene-ethylene copolymer (23° C. xylene extractable soluble component: 17% by weight, propylene content in the extractable soluble component: 47% by weight) prepared by copolymerizing propylene and ethylene using a Ziegler-Natta catalyst and 1 part by weight of ethylene-propylene copolymer rubber (EP 07P) as used in Example 1 were blended and kneaded to prepare a propylene-ethylene copolymer composition ($\alpha 12$) having an ethylene content of 10% by weight and containing 18% by weight of 23° C. xylene extractable soluble component. The viscosity ($\eta_1$) of this composition was $6.8 \times 10^2$ poises and the ratio ($\eta_1/\eta_2$) was 0.15. The propylene content of the 23° C. xylene extractable soluble component in this composition was 45% by weight.

After 8 parts by weight of Ketjen Black (the same as used in Example 12) were added to 100 parts by weight of compositions prepared by blending the above described copolymer composition ($\alpha 12$) with muscovite as was used in Example 8 in various ratios, test samples were produced by molding them in the same manner as in Example 1, and they were then evaluated.

For comparison, a composition prepared by blending 8 parts by weight of the same Ketjen Black as described above with 100 parts by weight of a composition which was prepared by blending 75 parts by weight of a composition ($\alpha 13$)—the viscosity ($\eta_1$) thereof was $5.8 \times 10^2$ poises and the ratio ($\eta_1/\eta_2$) was 0.13—containing 18% by weight of 23° C. xylene extractable soluble component (propylene content: 28% by weight) prepared by blending 82 parts by weight of crystalline polypropylene ($\alpha 11$) with 18 parts by weight of ethylene-propylene copolymer rubber (EP 07P) as used in Example 1, with 25 parts by weight of the muscovite described above was molded in the same manner as described above, and it was then evaluated.

As can be understood from the results shown in Table 13, the samples per the present invention were remarkably excellent in dimensional accuracy and electric conductivity as compared with those of the Comparative Examples and had good heat resistance, good rigidity and good impact resistance.

EXAMPLE 14

(Sample No. 57)

60 parts of weight of crystalline propylene-ethylene block copolymer ($\alpha 10$) used in Example 12, 40 parts by weight of finely divided mica as used in Example 12, 15 parts by weight of Ketjen Black and 0.2 part by weight of 2,6-di-t-butyl-4-methylphenol were blended and kneaded in the same manner as in Example 1 to produce pellets. When injection molding was carried out using the resulting pellets to form a housing for a computer, the resultant moldings had good shielding for electromagnetic waves and were remarkably excellent in dimensional accuracy and had good molding properties, heat resistance and mechanical properties.

EXAMPLE 15

(Sample No. 58)

The procedure of Example 14 was followed except that 40 parts by weight of Cabot CXS-99 (trade name of furnace black, produced by Cabot Co.) were used instead of 15% by weight of Ketjen Black. The resulting computer housings were remarkably excellent in shielding property for electromagnetic waves, dimensional accuracy and heat resistance.

EXAMPLE 16

65 parts by weight of propylene-ethylene block copolymer ($\alpha 10$) as was used in Example 12, 35 parts by weight of talc as was used in Example 1, 8 parts by weight of Ketjen Black as was used in Example 12, and 0.2 part by weight of 2,6-di-t-butyl-4-methylphenol were blended. The resultant mixture was molded in the same manner as in Example 1 to produce a test sample which was then evaluated.

For comparison, a composition prepared by blending 65 parts by weight of crystalline polypropylene ($\alpha 11$) as was used as a Comparative Example in Example 13, 35 parts by weight of the same talc as was used in Example 1 and 8 parts by weight of the same Ketjen Black as described above was molded and evaluated.

Results are shown in Table 14. As can be understood from this Table, the sample per the present invention was remarkably excellent in dimensional accuracy as compared with that of the Comparative Example, and had good electric conductivity.

TABLE 13

| | | | Evaluation | | | | | |
|---|---|---|---|---|---|---|---|---|
| | | | Electric | Dimensional Accuracy | | General Properties | | |
| | Composition (parts by weight) | | Conductivity Volume | Coefficient of Molding | Sink | Modulus of Bending | Heat Deformation | Du Pont Impact |
| | Polymer | Mica | Resistivity | Contraction | and | Elasticity | Temperature | Strength |
| No. | Kind Amount | Amount | ($\Omega \cdot$ cm) | (%) | Warp | (kg/cm$^2$) | (°C.) | (kg · cm) |
| 52 | $\alpha 12$ 87 | 12 | 105 | 0.7 | Small | 15,000 | 110 | >100 |
| 53 | $\alpha 12$ 70 | 30 | 75 | 0.48 | Hardly observed | 25,000 | 127 | 70 |
| 54 | $\alpha 12$ 45 | 55 | 30 | 0.28 | Hardly observed | 38,000 | 135 | 30 |
| 55* | $\alpha 12$ 100 | 0 | 540 | 1.7 | Great | 9,100 | 105 | >100 |
| 56* | $\alpha 13$ 70 | 30 | 140 | 0.95 | Fairly great | 23,000 | 122 | 65 |

*Comparative Example
In the Table, reference to the Ketjen Black is omitted for brevity.

TABLE 14

| | Composition (parts by weight) | | | Evaluation | | | | |
|---|---|---|---|---|---|---|---|---|
| | | | | Electric Conductivity | Dimensional Accuracy | | General Properties | |
| | Polymer | | Carbon | Volume | Coefficient | | Modulus of | Heat |
| | | Talc | Black | Resistivity | of Molding | Sink | Bending | Deformation |
| | | Amount | Amount | | Contraction | and | Elasticity | Temperature |
| No. | Kind Amount | | | ($\Omega \cdot$ cm) | (%) | Warp | (kg/cm$^2$) | (°C.) |
| 59 | α10 65 | 35 | 8 | 20 | 0.53 | Hardly observed | 28,000 | 122 |
| 60* | α11 65 | 35 | 8 | 65 | 1.10 | Fairly great | — | — |

*Comparative Example

EXAMPLE 17

After 8 parts by weight of Ketjen Black as was used in Example 12 were added to 100 parts by weight of compositions prepared by blending a propylene-ethylene copolymer composition (α12) as was used in Example 13 and finely divided talc having an average particle size of 1.3μ, a content of coarse particles having a size of 5μ or more of 4% and a specific surface area of 28,000 cm$^2$/g produced from steatite from China in various ratios, the mixtures were kneaded and molded in the same manner as in Example 1 to produce test samples which were then evaluated.

For comparison, 75 parts by weight of a composition (α13) composed of 82% by weight of crystalline polypropylene (α11) as was used in Example 13 as a Comparative Example and 18% by weight of ethylene-propylene copolymer rubber (EP 07P) as used in Example 1 were blended with 25 parts by weight of the same talc as described above and 8 parts by weight of the same Ketjen Black as described above, and the resultant mixture was molded and evaluated in the same manner as described above.

As can be understood from the results shown in Table 15, compositions per the present invention were remarkably excellent in dimensional accuracy and electric conductivity as compared with that of Comparative Example and had good heat resistance, rigidity and impact resistance.

out using these pellets to form a computer housing, the electromagnetic wave shielding property thereof was good, dimensional accuracy was remarkably excellent and the molding properties, heat resistance and mechanical properties were good.

EXAMPLE 19

(Sample No. 66)

When the same procedure as in Example 18 was carried out except that 40 parts by weight of Cabot CXS-99 were used instead of 15 parts by weight of Ketjen Black, computer housings which were remarkably excellent in electromagnetic wave shielding property, dimensional accuracy and heat resistance were obtained.

REFERENCE EXAMPLE 2

Injection molding was carried out (temperature: 240° C., injectiion pressure: 800 kg/cm$^2$) using pellets of Composition No. 1 in Example 1, and the heat resistance and the dimensional accuracy thereof were evaluated.

Further, as Comparative Examples, video cassette housings composed of conventional acrylonitrile-butadiene-styrene resin (Comparative Example 1) and a conventional propylene-ethylene block copolymer resin (Comparative Example 2) which were formed by the same molding as described above were examined.

Heat resistance was evaluated by the change in prop-

TABLE 15

| | Composition (parts by weight) | | | | Evaluation | | | | | |
|---|---|---|---|---|---|---|---|---|---|---|
| | | | | | Electric Conductivity | Dimensional Accuracy | | General Properties | | |
| | Polymer | | Talc | Carbon Black | Volume Resistivity | Coefficient of Molding | Sink and | Modulus of Bending Elasticity | Heat Deformation Temperature | Du Pont Impact Strength |
| No. | Kind | Amount | Amount | Amount | ($\Omega \cdot$ cm) | Contraction (%) | Warp | (kg/cm$^2$) | (°C.) | (kg · cm) |
| 61 | α12 | 85 | 15 | 8 | 63 | 0.72 | Small | 15,000 | 110 | >100 |
| 62 | α12 | 75 | 25 | 8 | 35 | 0.52 | Hardly observed | 22,000 | 123 | 78 |
| 63 | α12 | 50 | 50 | 8 | 15 | 0.32 | Hardly observed | 34,000 | 130 | 35 |
| 64* | α13 | 75 | 25 | 8 | 85 | 0.93 | Fairly great | 20,000 | 118 | 75 |

*Comparative Example

EXAMPLE 18

(Sample No. 65)

60 parts by weight of crystalline propylene-ethylene block copolymer (α10) as was used in Example 16, 40 parts by weight of finely divided talc as was used in Example 16, 15 parts by weight of Ketjen Black and 0.2 part by weight of 2,6-di-t-butyl-4-methylphenol were blended and kneaded by the same method as in Example 1 to form pellets. When injection molding was carried erties after standing in a hot blaster at 110° C. for 24 hours, which was more severe than exposure to heat accumulated by leaving the same on the front dash of a car in summer.

The case that size and strength hardly changed was evaluated as good, and the case that remarkable deformation was caused so that the cassette become unusable when allowed to stand at 110° C. for 30 minutes was evaluated as remarkably inferior.

As will be obvious from the results shown in Table 16, the sample per the present invention was remarkably excellent in heat resistance and dimensional accuracy as compared with the Comparative Examples.

TABLE 16

|  | Heat Resistance (110° C., 24 hours) | Coefficient of Molding Contraction (%) | Sink and Warp |
| --- | --- | --- | --- |
| Example 1 | Good | 0.43 | Hardly observed |
| Comparative Example 1 | Remarkably inferior | 0.45 | Hardly observed |
| Comparative Example 2 | Good | 1.60 | Great |

EXAMPLE 20

100 parts by weight of crystalline propylene-ethylene block copolymer (ethylene content: 18% by weight, 23° C. xylene extractable soluble component: 23% by weight, propylene content in the extractable soluble component: 57% by weight) prepared by copolymerizing propylene and ethylene with using a Ziegler-Natta catalyst and 1 part by weight of ethylene-propylene copolymer rubber (EP 07P) as was used in Example 1 were blended and kneaded to obtain a propylene-ethylene copolymer composition having an ethylene content of 18% by weight and containing 24% by weight of 23° C. xylene extractable soluble component. The viscosity ($\eta_1$) of this composition was $7.2 \times 10^2$ poises and the ratio ($\eta_1/\eta_2$) was 0.16. The propylene content of the 23° C. xylene extractable soluble component in this composition was 55% by weight. Further, the melt flow rate of this composition was 25 g/10 minutes.

55 parts by weight of the resultant copolymer composition, 25 parts by weight of finely divided talc having an average particle size of 1.5μ, a content of coarse particles having a size of 5μ or more of 1%, and a specific surface area of 28,000 cm$^2$/g produced from steatite from China, and 20 parts by weight of cubic finely divided precipitated calcium carbonate having an average particle size of 0.20μ and a content of coarse particle having a size of 5μ or more of 0% which had been subjected to surface treatment with stearic acid were blended and kneaded in the same manner as in Example 1 to form pellets.

These pellets were subjected to injection molding (temperature: 230° C., injection pressure: 900 kg/cm$^2$) to form parts of audio cassette housings, which were then subjected to various tests for practical application.

As a result, the size and the strength hardly changed after the 110° C. heat resisting test (allowed to stand in a hot blaster for 24 hours). The coefficient of molding contraction was very small like noncrystalline resins, and the external appearance such as gloss, etc., was excellent. Further, when a dropping test was carried out by dropping the housing from a height of 1.5 m at −10° C., no damage was observed. Further, a housing was made up from the parts by a double-groove screw. When the screwing force was measured by a torque driver, it was 2 kg.cm, which is sufficient for practical use.

While the invention has been described in detail and with reference to specific embodiments thereof, it will be apparent to one skilled in the art that various changes and modifications can be made therein without departing from the spirit and scope thereof.

What is claimed is:

1. An electrically conductive composition comprising 2 to 100 parts by weight of electrically conductive carbon black to 100 parts by weight of a composition which comprises 25 to 90% by weight of component (A) and 75 to 10% by weight of component (B):
(A) at least one member selected from the group consisting of
   (a) a crystalline propylene copolymer composed of propylene and one or more other α-olefins;
   (b) a composition prepared by blending the copolymer (a) with a synthetic rubber and/or crystalline polypropylene with a synthetic rubber, and
   (c) a composition prepared by blending a crystalline polypropylene with a synthetic rubber, wherein
   (1) the amount of xylene extractable soluble component at 23° C. is 10 to 50% by weight, and
   (2) the propylene content in the extractable soluble component is 30% by weight or more,
(B) an inorganic filler having an average particle size of 200μ or less, measured by light transmission in a liquid-phase sedimentation system.

2. An electrically conductive composition of claim 1, wherein the amount of the electrically conductive carbon black is 4 to 50 parts by weight.

3. An electrically conductive composition of claim 1, wherein the electrically conductive carbon black is SCF, ECF or Ketjen Black.

4. An electrically conductive composition of claim 1, wherein the electrically conductive carbon black has a specific surface area of 850 m$^2$/g or more.

* * * * *